United States Patent
Gamboa (10) Patent No.: US 9,327,376 B2
(45) Date of Patent: May 3, 2016

(54) DUAL FUNCTION MOVEMENT COMPONENT FOR AUTOMATED ASSEMBLY SYSTEMS

(71) Applicant: The Boeing Company, Chicago, IL (US)

(72) Inventor: James Darryl Gamboa, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 503 days.

(21) Appl. No.: 13/663,805

(22) Filed: Oct. 30, 2012

(65) Prior Publication Data

US 2014/0115894 A1 May 1, 2014

(51) Int. Cl.
*B23Q 9/00* (2006.01)
*B25B 11/00* (2006.01)
*B62D 57/024* (2006.01)

(52) U.S. Cl.
CPC ............. *B23Q 9/0007* (2013.01); *B25B 11/00* (2013.01); *B62D 57/024* (2013.01); *Y10T 29/49* (2015.01); *Y10T 29/49622* (2015.01)

(58) Field of Classification Search
CPC .... B25B 11/005; B25B 5/065; B23B 31/305; B23B 32/307; B23B 31/32; B23Q 9/0007; B23Q 3/088
USPC ....... 248/363; 269/21, 22; 29/281.1; 180/164
See application file for complete search history.

(56) References Cited

U.S. PATENT DOCUMENTS

| 3,167,145 | A | * | 1/1965 | Mackie ..................... 212/336 |
| 3,246,711 | A | * | 4/1966 | Snoeyenbos ............... 180/164 |
| 4,470,585 | A | * | 9/1984 | Bavelloni ................... 269/21 |
| 4,664,212 | A | | 5/1987 | Nagatsuka et al. |
| 4,926,957 | A | | 5/1990 | Urakami |
| 4,997,052 | A | | 3/1991 | Urakami |
| 5,161,631 | A | | 11/1992 | Urakami |
| 5,468,099 | A | | 11/1995 | Wheetley et al. |
| 5,633,707 | A | | 5/1997 | Seemann |
| 5,657,972 | A | * | 8/1997 | Blatt ............................ 269/22 |
| 5,890,553 | A | | 4/1999 | Bar-Cohen et al. |

(Continued)

FOREIGN PATENT DOCUMENTS

| EP | 0430161 | 6/1991 |
| EP | 1757514 | 2/2007 |

(Continued)

OTHER PUBLICATIONS

Extended European Search Report, Patent Application No. 14178423.1 dated Jan. 22, 2015.

(Continued)

*Primary Examiner* — Lee D Wilson
*Assistant Examiner* — Jamal Daniel
(74) *Attorney, Agent, or Firm* — Kunzler Law Group, PC (57) ABSTRACT

A pneumatic device may be configured and used to provide multiple movement related functions, such as in an automated assembly system. The pneumatic device may comprise a chamber; a sealing element configurable to contact a surface, to enable creating a seal around the chamber by application of pneumatic suction into the chamber; a biasing element configurable to push the sealing element away from the surface; and a pneumatic cushion configurable to expand by application of pneumatic inflow, thus urging the pneumatic device away from the surface.

7 Claims, 9 Drawing Sheets

(56) References Cited

U.S. PATENT DOCUMENTS

| | | | |
|---|---|---|---|
| 6,357,101 B1 | 3/2002 | Sarh et al. | |
| 6,413,022 B1 | 7/2002 | Sarh | |
| 6,536,100 B2 | 3/2003 | Sarh et al. | |
| 6,729,809 B2 | 5/2004 | Sarh et al. | |
| 7,003,860 B2 | 2/2006 | Bloch et al. | |
| 7,174,982 B2* | 2/2007 | Kraus | 180/125 |
| 7,380,776 B2* | 6/2008 | Boyl-Davis et al. | 269/21 |
| 7,416,176 B2* | 8/2008 | Hamann | 269/266 |
| 8,006,362 B2 | 8/2011 | Sarh | |
| 8,019,472 B2* | 9/2011 | SanJuan et al. | 700/245 |
| 8,490,955 B2 | 7/2013 | Sarh et al. | |
| 8,573,070 B2 | 11/2013 | Sarh et al. | |
| 2005/0263949 A1* | 12/2005 | Boyl-Davis et al. | 269/266 |
| 2006/0277733 A1* | 12/2006 | Boyl-Davis et al. | 29/26 B |
| 2007/0132255 A1* | 6/2007 | Perlman et al. | 294/64.1 |
| 2010/0071192 A1 | 3/2010 | Sarh et al. | |
| 2012/0014759 A1 | 1/2012 | Sarh et al. | |
| 2012/0193500 A1* | 8/2012 | Kniss et al. | 248/363 |
| 2012/0210802 A1 | 8/2012 | Sarh et al. | |
| 2013/0285399 A1 | 10/2013 | Sarh et al. | |
| 2014/0115850 A1* | 5/2014 | Gamboa | 29/281.6 |
| 2014/0115860 A1* | 5/2014 | Sarh et al. | 29/428 |
| 2014/0237793 A1* | 8/2014 | Gamboa | 29/426.2 |

FOREIGN PATENT DOCUMENTS

| | | |
|---|---|---|
| GB | 2486013 | 6/2012 |
| JP | 60092173 | 5/1985 |
| JP | 60219172 | 11/1985 |
| WO | 2008130193 A1 | 10/2008 |

OTHER PUBLICATIONS

PCT/US2013/059842 International Search Report and Written Opinion mailed Jan. 29, 2014.

PCT/US2013/058057 International Search Report and Written Opinion mailed Nov. 28, 2013.

Office Action for Canadian Application No. 2,853,847 dated Jul. 24, 2015.

Office Action for Canadian Patent Application No. 2,885,514 dated Feb. 12, 2016.

* cited by examiner

DUAL FUNCTION MOVEMENT COMPONENT FOR AUTOMATED ASSEMBLY SYSTEMS

FIELD

Certain embodiments of the disclosure relate to manufacturing and more specifically to component assembly during aircraft manufacturing. More specifically, certain embodiments of the disclosure relate to an apparatus and method for dual function movement component for automated assembly systems.

BACKGROUND

Manufacturers, including aircraft manufactures for example, are under continuous pressure to reduce costs associated with and/or enhance efficiency of manufacturing processes. In this regard, manufacturing a particular article (e.g., aircraft) may require performing various steps to produce a complete example of the article. The type of steps undertaken in a manufacturing process may be dictated by the article itself (e.g., number, size, and/or shape of components), and/or by other conditions pertinent to the manufacturing process (e.g., separate production of components of the article). For example, manufacturing aircraft may require assembling components, such as fuselage or wing sections, which may be made separately, sometimes at different locations and/or by different sub-contractors. In some instances, automated devices may be utilized during manufacturing processes. In this regard, automated devices may be fixed, with the article being manufactured (or components thereof) moving (e.g., via an assembly line) to allow the automated devices to operate (e.g., applying fastening bolts). Alternatively, the automated devices may be configured as moving devices that traverse the manufactured article (or component(s) thereof) while operating on the article (or component(s)). For example, in aircraft manufacturing, automated systems capable of crawling over aircraft structures may be used, being configured to accurately position at particular location (e.g., over a fastener location), and to perform necessary operations thereat (e.g., processing the needed hole and installing a fastener).

Use of such automated systems may pose certain challenges, however. For example, challenges associated with these types of automated systems may include or relate to performing necessary course adjustments and/or enhancing the manner by which the system moves from one location to the next. In this regard, many currently available systems suffer from such limitations as low speed of movement over structure and/or skidding during course adjustments, as a result of, for example, the means currently used in securing such automated systems to the structures and/or moving them on these structures. For example, some current systems may utilize vacuum cups to adhere the system to structures. Use of such vacuum cups, however, may necessitate deactivating the vacuum cup and pulling them away from the structure before movement of the system. As for course adjustments, current systems may utilize rotation of support legs or feet to turn the system and make course adjustments. This, however, may lead to skidding of the pressure foot and is a less controlled steering method.

Therefore, it would be advantageous to have an apparatus and method for providing automated assembly in a manner that enhances speed and/or movement of machines used during assembly of articles, such as aircraft.

Further limitations and disadvantages of conventional and traditional approaches will become apparent to one of skill in the art, through comparison of such systems with some aspects, as set forth in the remainder of the present application with reference to the drawings.

SUMMARY

An apparatus and/or method is provided for an dual function movement component for automated assembly systems, substantially as shown in and/or described in connection with at least one of the figures, as set forth more completely in the claims.

In one aspect, a pneumatic device may be used as a multi-function movement component, such as one of a plurality of movement components in an apparatus that may be used in assembling or manufacturing operations (e.g., of aircraft or components thereof). The pneumatic device may comprise a chamber; a sealing element configurable to contact a surface, to enable creating a seal around the chamber by application of pneumatic suction into the chamber, thus urging the pneumatic device towards the surface; a biasing element configurable to push the sealing element away from the surface, to enable disabling the urging towards the surface; and a pneumatic cushion configurable to expand, by application of pneumatic inflow, thus urging the pneumatic device away from the surface.

In another aspect, an apparatus may comprise a movement assembly for use in an automated motorized device that is operable to traverse a structure (e.g., aircraft or components thereof), such as to perform assembling or manufacturing operations. The movement assembly may comprise a plurality of dual function movement components, wherein functions of each dual function movement component comprise adhering to the structure and gliding over the structure; and each dual function movement component comprises a plurality of elements adapted for supporting each of the functions. The movement assembly may also comprise a holding component, to which at least some of the plurality of dual function movement components are attached, to allow application of functions of the at least some of the plurality of dual function movement components to the structure.

In another aspect, a method for supporting assembling or manufacturing operations in an automated motorized device, which may be used in assembling or manufacturing operations (e.g., of aircraft or components thereof), may comprise moving the automated motorized device on a structure by use of a plurality of dual function movement components, wherein the plurality of dual function movement components is arranged into one or more movement assemblies, each of the one or more movement assemblies is configured to operate separately, and functions of each dual function movement component comprise adhering and gliding.

In another aspect, a method for fabricating an aircraft component may comprise moving by use of a plurality of dual function movement components, an automated motorized device that is configured to apply one or more fabricating related functions to each of a plurality of predetermined locations on the aircraft component. In this regard, the plurality of dual function movement components may be arranged into one or more movement assemblies, with each of the one or more movement assemblies being configured to operate separately, and with functions of each dual function movement component comprising, at least, an adhering function and a gliding function. The automated motorized device may be moved by configuring at least one dual function movement component of at least one of the one or more movement assemblies to apply the gliding function. The automated motorized device may be secured to the aircraft component by configuring at least one dual function movement component of at least one of the one or more movement assemblies to apply the adhering function.

These and other advantages, aspects and novel features, as well as details of an illustrated embodiment thereof, will be more fully understood from the following description and drawings.

The features, functions, and advantages that have been discussed can be achieved independently in various embodiments or may be combined in yet other embodiments further details of which can be seen with reference to the following description and drawings.

DETAILED DESCRIPTION

Certain embodiments may be found in a method and system for a dual function movement component for use in automated assembly systems. Many specific details of certain embodiments are set forth in the following description as well as the drawings to provide a thorough understanding of such embodiments. One skilled in the art, however, will understand that there may be additional embodiments, or that certain of these embodiments may be practiced without several of the details described in the following description. Like numbers refer to like elements throughout.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1:
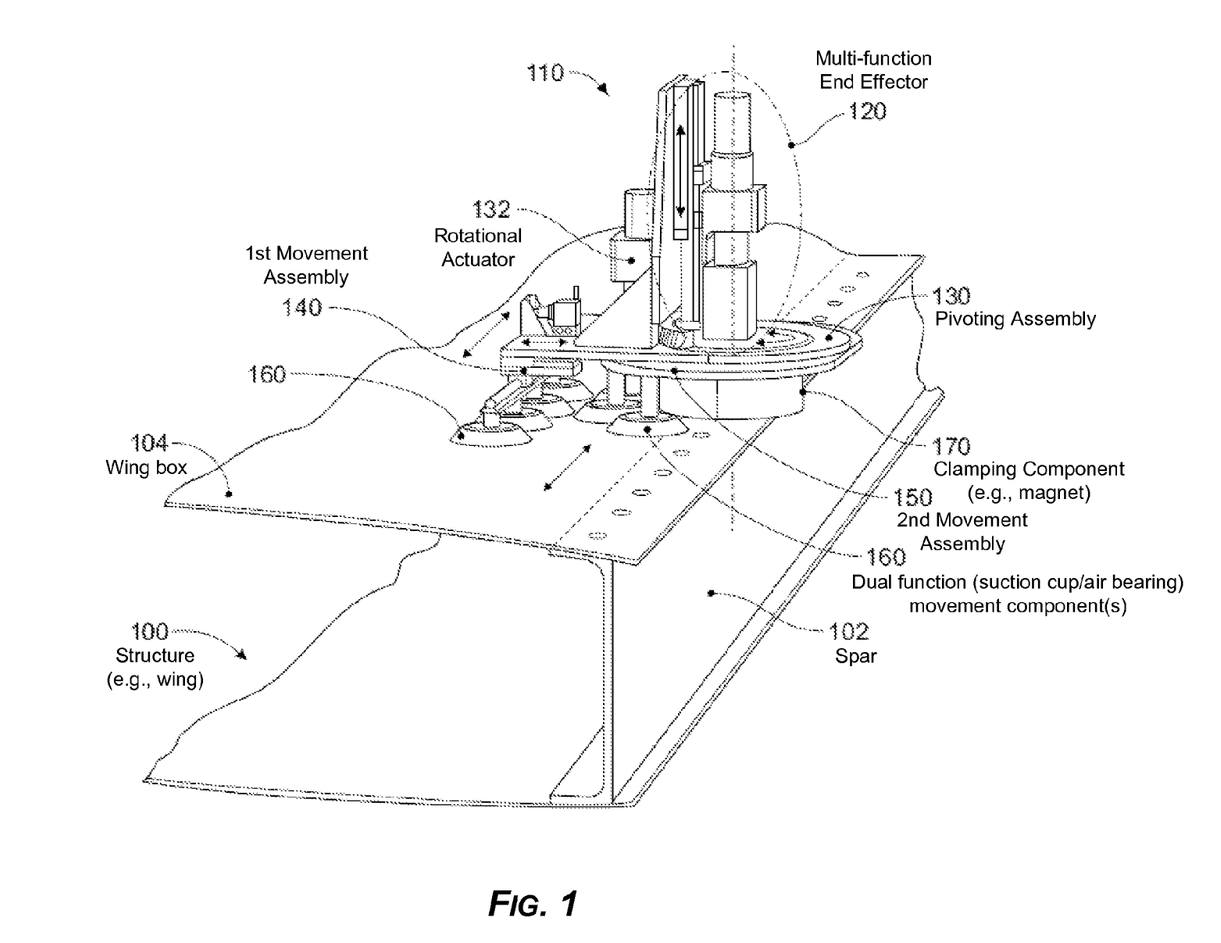
FIG. 1 is a diagram illustrating a dual function movement component for automated assembly systems that may be used during assembly of component(s), such as during manufacturing of aircraft, in accordance with an advantageous embodiment.

FIG. 1 is a diagram illustrating an autonomous crawling assembly system that may be used during assembly of component(s), such as during manufacturing of aircraft, in accordance with an advantageous embodiment. Referring to FIG. 1, there is shown a crawler 110.

The crawler 110 may be a portable, automated motorized device which may be operable to move to a physical target, such as an assembly or component, that may be used in performing particular operations (e.g., a drilling, bolting, and/or fastening), in a controlled manner. For example, the crawler 110 may be used during manufacturing and/or assembly of aircraft or components thereof (e.g., fuselage or wings). In this regard, the crawler 110 may preferably be placed on a structure 100 (e.g., wing of aircraft), and may then move over the structure 100 while performing assembling related operations thereon, at different locations (e.g., intended bolting positions on the wing).

The crawler 110 may comprise a plurality of components performing various operations in support of intended functions of the crawler 110. For example, the crawler 110 may comprise a multi-function end effector 120, a pivoting assembly 130, a first movement assembly 140 and a second movement assembly 150, and a clamping component 170. The multi-function end effector 120 may be configured to perform one or more assembling related operations or functions, which may be utilized during manufacturing of articles, such as aircraft or components thereof. For example, the multi-function end effector 120 may be configured to perform such functions as drilling bolting holes and/or applying fastening bolts. Use of such functions may be made, for example, during assembling of aircraft wings. In this regard, assembling functions applied by the multi-function end effector 120 to the wing may enable bolting a spar 102 to a wing box 104.

The first movement assembly 140 and the second movement assembly 150 may enable, individually and/or in combination, moving the crawler 110 along the structure 100 (e.g., the wing, or more specifically the wing box 104) to which the functions of the multi-function end effector 120 may be applied. In this regard, the first movement assembly 140 and the second movement assembly 150 may be configured such as to provide, while operating individually and/or in combination, autonomous movement of the crawler 110, in a controlled manner that may enable optimizing operation of the crawler 110 (and/or functions performed thereby—e.g., assembling related functions), such as by enhancing speed of movement of the crawler 110 without compromising (or even with improvement to) the holding (or securing) of the crawler 110 to the structure 100. This may be achieved, for example, by incorporating into each of the first movement assembly 140 and the second movement assembly 150 a plurality of dual function movement components 160. In this regard, each dual function movement component 160 may be configured to provide multiple functions related to support and movement of the crawler 110. The dual function movement component 160 may be configured to provide, for example, both of an adhering or a holding function (e.g., relating to securing the crawler 110 to the structured being traversed), and a gliding or a hovering function (e.g., relating to moving the crawler 110 over the structures being traversed). For example, the dual function movement component 160 may comprise a suction cup/air bearing assembly that may be configured to provide a securing function—i.e., enabling 'holding' the corresponding movement assembly (first or second)—by use of vacuum created via the suction cup; and to provide the 'gliding' or 'hovering' function—i.e., facilitating moving or sliding of the corresponding movement assembly (first or second)—by use of air bearing (e.g., hovering) over the structure.

In some instances, to enhance use of the movement components of the crawler 110 (e.g., the first movement assembly 140 and the second movement assembly 150), the crawler 110 may comprise pivoting means (e.g., the pivoting assembly 130), which may be used to allow for (when needed) rotating of particular components of the crawler 110, preferable in a controlled manner and/or independent of other components of the crawler 110. For example, the pivoting assembly 130 may comprise one or more pivoting components, which may allow for rotating or pivoting of particular components of the crawler 110, such as the multi-function end effector 120, the first movement assembly 140, and/or the second movement assembly 150 which may allow for rotating one or more of these components while the other component(s) or the crawler 110 is secured to the structure. Doing so may enhance movement of the crawler 110, such as by allowing at least part of any required movement adjustments to be performed while the crawler 110 is being utilized for its intended function (e.g., while the multi-function end effector 120 is being utilizing to apply assembling related functions). To further enhance operation of the crawler 110, a rotation actuator 132 may be incorporated into the pivoting assembly 130, which may ensure the multi-function end effector 120 remains unmoved (e.g., while it is being utilizing to apply assembling related functions) even while one or both of the first movement assembly 140 and the second movement assembly 150 may be rotated or pivoted.

In an implementation, the crawler 110 may comprise clamping or securing means (e.g., the clamping component 170), which may be used to ensure that the multi-function end effector 120 is firmly secured to the structure 100 to which the assembling functions are applied by the multi-function end effector 120. For example, the clamping component 170 may comprise a non-permanent magnet which may be activated (e.g., using electric current) when the multi-function end effector 120 needs to be secured to the structure (e.g., when the multi-function end effector 120 is positioned at a location on the wing box 104 where a fastening bolt is to be applied); otherwise, the magnet which may be deactivated, such as when the crawler 110 (or parts thereof, such as the multi-function end effector 120) may be moving.

In an implementation, the crawler 110 may also comprise one or more motors (not shown), which may be utilized to enable and/or support the automated motorized movement of the crawler 110, such as by driving and/or enabling functions of at least some of components of the crawler 110 used in conjunction with movement and/or use of the crawler 110 (e.g., rotating/securing component of the multi-function end effector 120, the first movement assembly 140, and/or second movement assembly 150).

In an implementation, the crawler 110 may comprise a controller component (not shown) for controlling various operations and/or components of the crawler 110. In this regard, the controller component may comprise a programmable circuitry providing control signals to at least some of the components of the crawler 110, to enable configuring these components to perform various operations in support of the functions of the crawler 110. For example, the controller component may control operations of the movement component of the crawler 110.

In an implementation, the crawler 110 may be configured to receive and/or transmit information, such as by incorporating a communication component for providing and/or handling communications to and/or from the crawler 110. In this regard, the crawler 110 may receive, for example, user input, which may be used in controlling and/or adjusting various operations or functions of the crawler 110. The user input may comprise, for example, movement related commands, such as "start" or "stop" and/or other similar commands. The communication component may also be configured to enable transmitting status information, such as information relating to various components or functions of the crawler 110. The status information may be transmitted to other devices that may be utilized by users (e.g., a computer). The reception and/or transmission may be performed wirelessly, using one or more appropriate technologies. For example, communications may be via infra-red (IR) signals, near field communication (NFC) signals, Bluetooth signals, and/or WiFi signals. This disclosure is not limited, however, to any particular communication technology.

Figure 2:
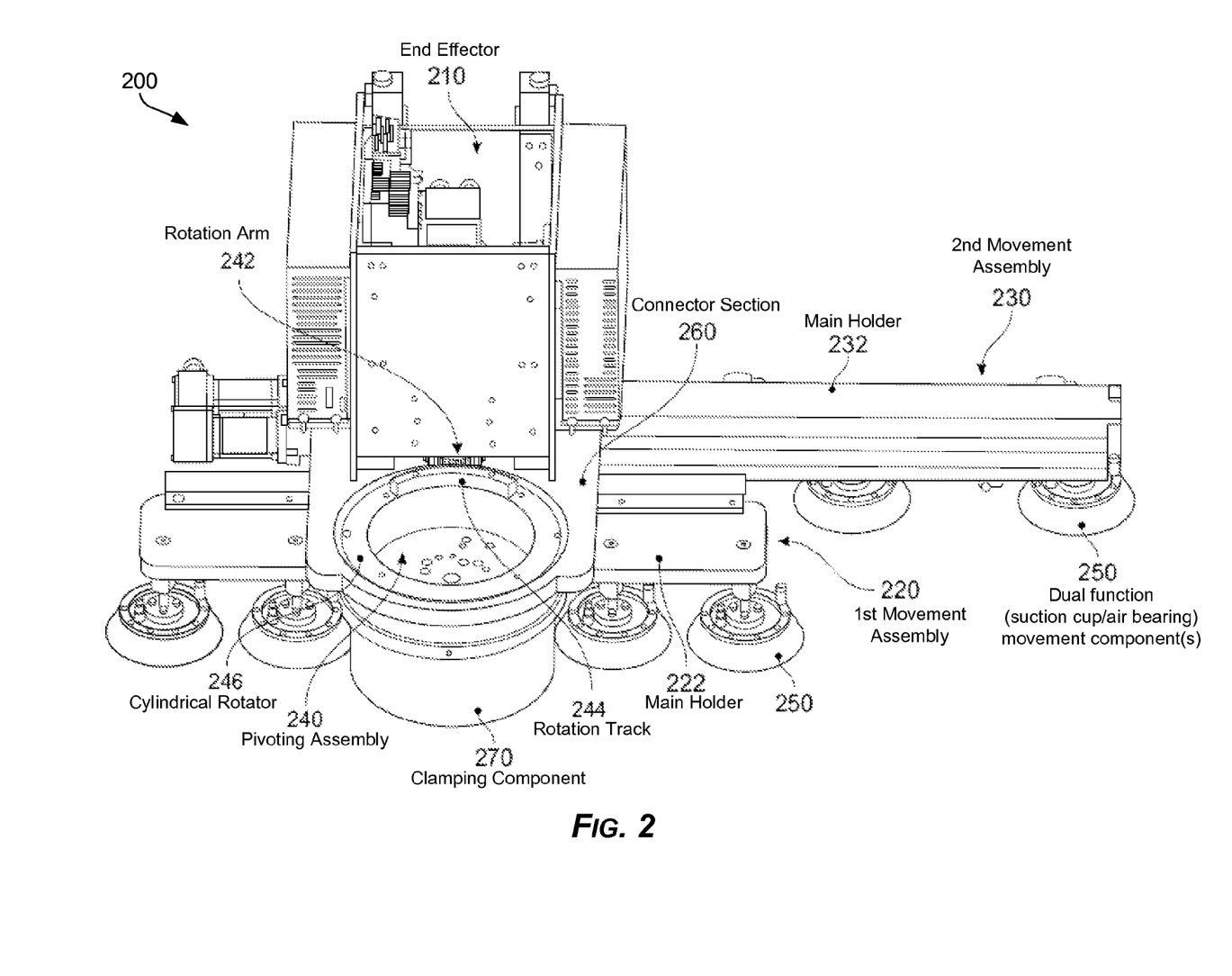
FIG. 2 is a diagram illustrating a dual function movement component for automated assembly systems that may be used during assembly of component(s), such as during manufacturing of aircraft, in accordance with an advantageous embodiment.

FIG. 2 is a diagram illustrating an autonomous crawling assembly system that may be used during assembly of component(s), such as during manufacturing of aircraft, in accordance with an advantageous embodiment. Referring to FIG. 2, there is shown a crawler 200.

The crawler 200 may represent an implementation of the crawler 110, as described with respect to FIG. 1. In this regard, as with the crawler 110, the crawler 200 may be a portable, automated motorized device which may be configured to move over a structure, to apply manufacturing and/or assembling related functions or operations thereto. In particular, the crawler 200 may be configured for use during manufacturing and/or assembly of aircraft or components thereof (e.g., fuselage or wings). In this regard, the crawler 200 may preferably be placed on the structure (e.g., the wing 100 of FIG. 1), and may then move over the structure 100 while performing assembling related operations thereon, at different locations (e.g., intended bolting positions on the wing(s)).

In various implementations, the crawler 200 may be configured to move and/or operate in optimized manner compared to existing systems. In this regard, there may be various challenges associated with use of automated assembling systems, particularly with respect to course adjustments and/or the manner by which in which the system moves from one location to the next. For example, many currently available systems suffer from such limitations as low speed of movement over structure(s) and/or skidding during course adjustments, as a result of currently used means for securing or holding such automated systems to the structures and/or for moving them (or adjusting the course of movement) on the structure(s). To achieve the desired enhancements in terms of speed of movement, course or movement adjustments, and/or reliability of system's 'holding' onto the structure(s), the crawler 200 may incorporate various components (or enhancements to components). The crawler 200 may incorporate, for example, a plurality of movement assemblies, to enable performing at least a portion of required movement (or adjustment of course thereof) while the crawler 200 is being used to apply assembling related functions. In this regard, these movement assemblies may comprise movement components that support multiple functions related to movement operations, which may allow for configuring some movement components (e.g., those of particular movement assembly) to perform one function (e.g., 'holding' or 'securing') while other movement components (e.g., those of another movement assembly) are being configured to perform another function (e.g., movement related functions, such as 'gliding' or 'sliding' for example). The crawler 200 may also incorporate dedicated components that may allow rotating the movement related assemblies (or components thereof) in a manner that ensures and/or maintains the overall system's hold onto the structure—i.e., preventing any skidding or falling off the structure—including when the rotating is done while the crawler 200 is being used in applying assembling related functions. For example, the crawler 200 may comprise an end effector 210, a first movement assembly 220 and a second movement assembly 230, a pivoting assembly 240, a connector section 260, and a clamping component 270.

The end effector 210 may be substantially similar to the multi-function end effector 120, as described with respect to FIG. 1. In this regard, end effector 210 may be configured to perform one or more assembling related operations or functions, which may be utilized during, for example, manufacturing or assembling of aircraft or components thereof. For example, the end effector 210 may be configured to perform such operations or functions as drilling bolting holes and/or applying fastening bolts.

The first movement assembly 220 and the second movement assembly 230 may be substantially similar to first movement assembly 140 and the second movement assembly 150, respectively, of FIG. 1. In this regard, the first movement assembly 220 and the second movement assembly 230 may be configured to enable, individually and/or in combination, moving the crawler 200 along a structure (e.g., a wing) to which the functions of the end effector 210 may be applied. Each of the first movement assembly 220 and the second movement assembly 230 may comprise a main holder (222 and 232, respectively), to which a plurality of dual function movement components 250 may be attached. In this regard, each dual function movement component 250 may be configured to provide multiple functions related to movement of the crawler 200. The dual function movement component 250 may be configured to provide, for example, both an 'adhering' function (e.g., relating to 'securing' or 'holding' the crawler 200 to the structured being traversed) and a 'gliding' function (e.g., relating to moving, preferably with as little resistance as possible, the crawler 200 over the structured being traversed). For example, each dual function movement component 250 may comprise combination of suction cup/air bearing elements, which may be configured to provide the adhering function (i.e., enabling 'holding' to the structure) by means of vacuum created via the suction cup; and to provide the 'gliding' or 'hovering' function (i.e., facilitating moving or sliding over the structure) by use of air bearing (e.g., hovering). In some instances, the main holders 222 and 232 may also be configured to provide additional function(s), beyond simply attaching the dual function movement component(s) 250 to the movement assemblies. For example, the main holders 222 and 232 may incorporate flexible and/or movable elements that may allow for bending—that is to allow for application of the dual function movement component(s) 250 in curved manner as to accommodate for curves or contours of the structure along the movement path. Some examples of the dual function movement component 250 of the crawler 200, and/or operations or use thereof, are described in the following paragraphs relating to FIGS. 3, 4A, and 4B.

The pivoting assembly 240 may comprise a plurality of elements or components which may be configured to allow for, when needed, rotating or pivoting (including, in some instances, three-dimensionally) of particular components of the crawler 200, preferable in a controlled manner and/or independent of other components of the crawler 200. In addition, and further enhancing operation of the crawler 200, the pivoting assembly 240 may be configured to perform at least some pivoting or rotating required for movement adjustments while the crawler 200 is being used (e.g., while the end effector 210 is utilized in applying assembling related functions). The pivoting assembly 240 may comprise, for example, a rotating arm 242, a rotating track 244, and a cylindrical rotator 246, which may be configured to allow for rotating or pivoting of particular components of the crawler 200, such as the end effector 210, the first movement assembly 220, and/or the second movement assembly 230. In this regard, the rotating arm 242 (not shown in FIG. 2) may be configured to pivot or rotate, such as by moving along the rotation track 244 (using gears or teeth). Thus, by attaching an end of the rotating arm 242 to a movement assembly (e.g., the second movement assembly 230), the movement assembly may be rotated or pivoted relative to the other movement assemblies (e.g., the second movement assembly 230). The cylindrical rotator 246 may be configured to allow for rotating or pivoting of another movement assembly. In this regard, the cylindrical rotator 246 may be used, for example, for rotating that movement assembly, or to maintain position of that movement assembly as other movement assemblies are being pivoted or rotated via the rotating arm 242. The cylindrical rotator 246 may be used in similar manner to rotate (or maintain position of) the end effector 210.

The connector section 260 may connect the first movement assembly 220 and the second movement assembly 230. The connector section 260 may comprise a 'track' or 'rail' element, to allow the second movement assembly 230 to slide through the connector section 260 for example. In other words, the connector section 260 may be connected to the second movement assembly 230 such that connection point(s) between the connector section 260 and the assembly main holder (232) may be adjusted along the main holder (232), thus allowing for straight movement of the second movement assembly 230 relative to the connector section 260. On the other hand, the connector section 260 may be connected to the first movement assembly 220 such that the connection point(s) between the connector section 260 and the assembly main holder (222) may be fixed along the main holder (222), but may allow for rotational (pivotal) adjustments. In other words, the connector section 260 and the first movement assembly 220 may be rotated relative to one another (e.g., via the pivoting assembly 240).

The clamping component 270 may be similar to the clamping component 170, as described with respect to FIG. 1. In this regard, the clamping component 270 may be configured to support securing the crawler 200 or component(s) thereof (e.g., the end effector 210), such as when the end effector 210 is engaged in applying assembling related functions at a particular location (e.g., bolt position on a wing structure). For example, the clamping component 270 may incorporate a non-permanent magnet which may be activated (e.g., using electric current) to apply the required clamping (e.g., when the end effector 210 is being secured to the structure), and deactivated otherwise.

Figure 3A:
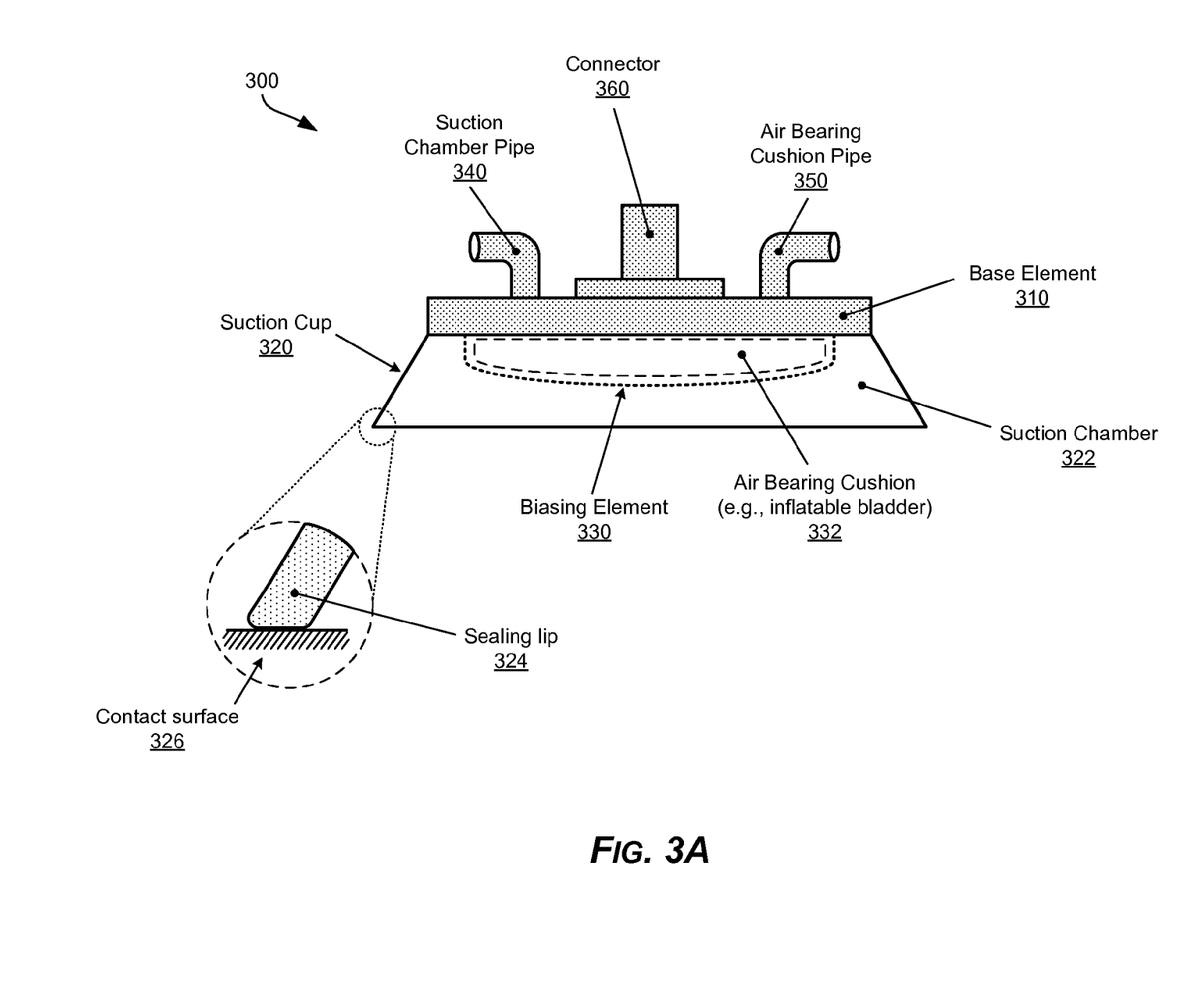
FIG. 3A is a diagram illustrating a dual function movement component that may be used in automated assembly systems, in accordance with an advantageous embodiment.

FIG. 3A is a diagram illustrating a dual function movement component that may be used in automated assembly systems, in accordance with an advantageous embodiment. Referring to FIG. 3A, there is shown a dual function movement component 300. In this regard, the dual function movement component 300 may correspond to each of the dual function movement components 250 of FIG. 2.

The dual function movement component 300 may comprise a base element 310, which may correspond to the main section of the dual function movement component 300, with the remaining elements of the dual function movement component 300 being attached thereto. A connector 360 may be attached to the base element 310. In this regard, the connector 360 may be used in attaching the dual function movement component 300 to other object(s), such as movement assemblies (e.g., the first and second movement assemblies 220 and 230 of FIG. 2).

The dual function movement component 300 may comprise one or more elements configured to provide or support the 'holding' or 'adhering' functions. For example, the dual function movement component 300 may comprise a suction cup 320, which may be utilized in providing the 'holding' function, such as by use of vacuum to create a pulling force to enable adhering the dual function movement component 300 to a surface (326) with which the suction cup 320 may be in contact. In this regard, the suction cup 320 may comprise suction chamber 322, which may comprise a cavity or space within the suction cup 320, within which vacuum may be created to generate the 'holding' force. To that end, the suction cup 320 may also comprise a sealing element that may be utilized to provide the sealing required to create the necessary vacuum for generating the 'holding' force. The sealing element may comprise a sealing lip 324, for example, which may be configured to provide sufficient sealing between the space between the suction cup 320 and the contact surface 326. The vacuum in the suction chamber 322 may be created by sucking the air from the suction chamber 322, via a suction chamber pipe 340 running through the base element 310. In this regard, a pump or vacuum source may be connected to the suction chamber pipe 340 (e.g., using a tube) to allow applying air suction into the suction chamber 322.

The dual function movement component 300 may comprise one or more elements configured to provide a 'gliding' or 'hovering' function. For example, the dual function movement component 300 may comprise a biasing element 330, which may be utilized in providing the 'hovering' function, such as by breaking the 'holding' created by the suction cup 320, and/or by allowing the dual function movement component 300 to glide over the surface (326) using the contact between the biasing element 330 and the surface (326) once there is no 'holding' force applicable anymore. To that end, the biasing element 330 may be placed within the suction chamber 322, being attached to the base element 310, and may be configured (the biasing element 330) such as it may remain fully contained within the suction chamber 322 when the 'hovering' function is not applied (e.g., during application of the 'holding' function). Furthermore, the biasing element 330 may also be configured to extend beyond the edges of the suction cup 322 when applying the 'hovering' function, thus allowing for breaking the seal created via the sealing lip 324.

For example, the biasing element 330 may comprise an air bearing cushion 332, which may be configured to allow providing the 'hovering' function (and seal breaking) function(s) by use of air. In this regard, the air bearing cushion 332 may comprise an inflatable bladder, which may be filled with air, to expand the air bearing cushion 332 (and thus push the biasing element 330, eventually beyond the level of the sealing lip 324 of the suction cup 320). To end the 'hovering' function (and/or to allow application of the 'holding' function) air may be removed from the air bearing cushion 332 (e.g., resulting in the biasing element 330 being retracted below the level of the sealing lip 324 of the suction cup 320). Air may be injected into the air bearing cushion 332 and/or removed from it via, for example, an air bearing cushion pipe 350 running through the base element 310. In this regard, the air bearing cushion pipe 350 may be connected (e.g., using a tube) to an air pump, which may be used in injecting air into the air bearing cushion 332 (e.g., when applying air bearing) or to suck air out of the air bearing cushion 332 (e.g., when ending 'hovering' function or (re)applying 'holding' function).

In operation, the dual function movement component 300 may be used in applying various functions—e.g., 'holding' (or 'adhering') and 'hovering' (or 'gliding'), such as to enable enhancing movement of automated assembly device (e.g., the crawler 200 of FIG. 2). In this regard, a plurality of the dual function movement components 300 may be used, being arranged into a plurality of movement assemblies, which may enable using some of the movement components in providing 'holding' while the remaining movement components are being used in providing 'gliding' over the assembled structure. Examples of application of the 'holding' and 'hovering' functions via the dual function movement component 300 are described in more detailed in FIG. 3B.

Figure 3B:
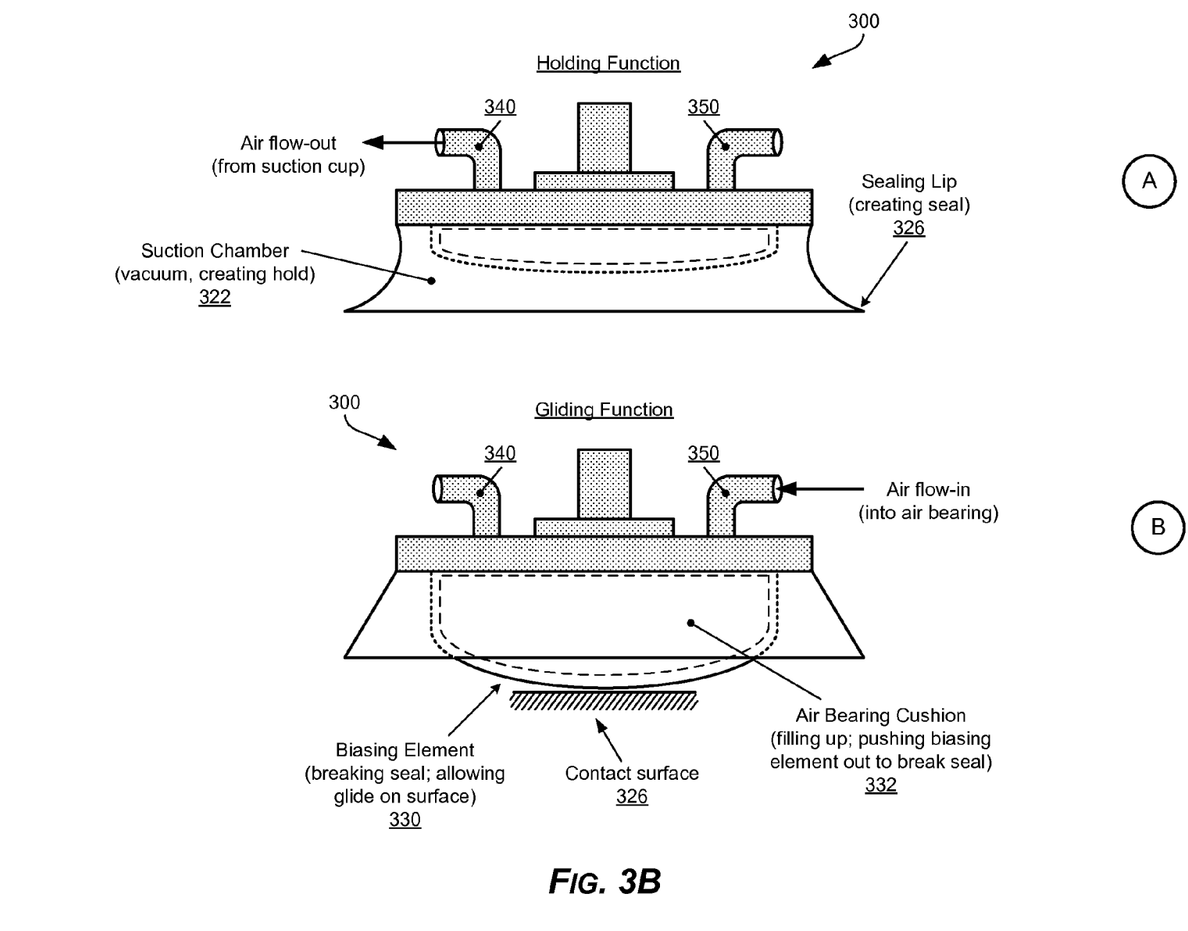
FIG. 3B is a diagram illustrating different functions of a dual function movement component that may be used in automated assembly systems, in accordance with an advantageous embodiment.

FIG. 3B is a diagram illustrating different functions of a dual function movement component that may be used in automated assembly systems, in accordance with an advantageous embodiment. Referring to FIG. 3B, there is shown the dual function movement component 300 of FIG. 3A.

To apply the 'holding' function, as shown in (A), the dual function movement component 300 may be configured to use vacuum to provide pulling force onto the surface (326). In this regard, vacuum may be created using the suction cup 320, such as by sucking the air from the suction chamber 322, via the suction chamber pipe 340, which may be connected to a vacuum source (not shown). In other words, sucking the air out of the suction chamber 322 may create a vacuum therein. Furthermore, to allow creating the vacuum and/or generating the pulling force (creating the 'holding' onto the surface (326)), applying the air suction into the suction chamber 322, contact space between suction cup 320 and the surface 326 may be sealed to ensure that air does not leak into the suction chamber 322 (thus breaking the 'holding'). For example, the suction cup 320 may incorporate sealing lip 324, which may create the requisite seal, such as by application of the air suction into the suction chamber 322. In some instances, application of the 'holding' function may also comprise ensuring that the biasing element 330 is retracted below the level of the sealing lip 324 of the suction cup 320. This may be achieved by applying air suction to the air bearing cushion 332, via the air bearing cushion pipe 350, to deflated the air bearing cushion 332 (and thus enable retracting the biasing element 330).

To apply the 'hovering' function, as shown in (B), the dual function movement component 300 may be configured to use air bearing, to ensure that the dual function movement component 300 is not adhered to the surface 326, and/or to create a cushion of high-pressure air that allow the dual function movement component 300 to hover and/or glide on the surface 326. In this regard, the 'hovering' may be by injecting air into the air bearing cushion 332, such as via the air bearing cushion pipe 350, from an air pump (not shown) attached to the air bearing cushion pipe 350 (e.g., suing a tube), to inflate the air bearing cushion 332. The air bearing cushion 332 may be inflated (by continuing the air injection) until the air bearing cushion 332 (and thus the biasing element 330) is expanded beyond the level of the sealing lip 324 of the suction cup 320), thus breaking (in the process) any seal between the suction cup 320 and the surface. Accordingly, applying the 'hovering' function may also indirectly result in (and thus be used to) breaking the 'holding' function. In some instances, however, applying the 'hovering' function may also comprise ending the 'holding' function, by terminating (or even reversing) the air suction being applied to the suction chamber 322. Thus, in addition to applying air injection via the air bearing cushion pipe 350, the 'hovering' function may also comprise terminating air suction via the suction chamber pipe 340 or even applying air injection through it, to ensure that any vacuum previously created in the suction chamber 322 is terminated.

Figure 4A:
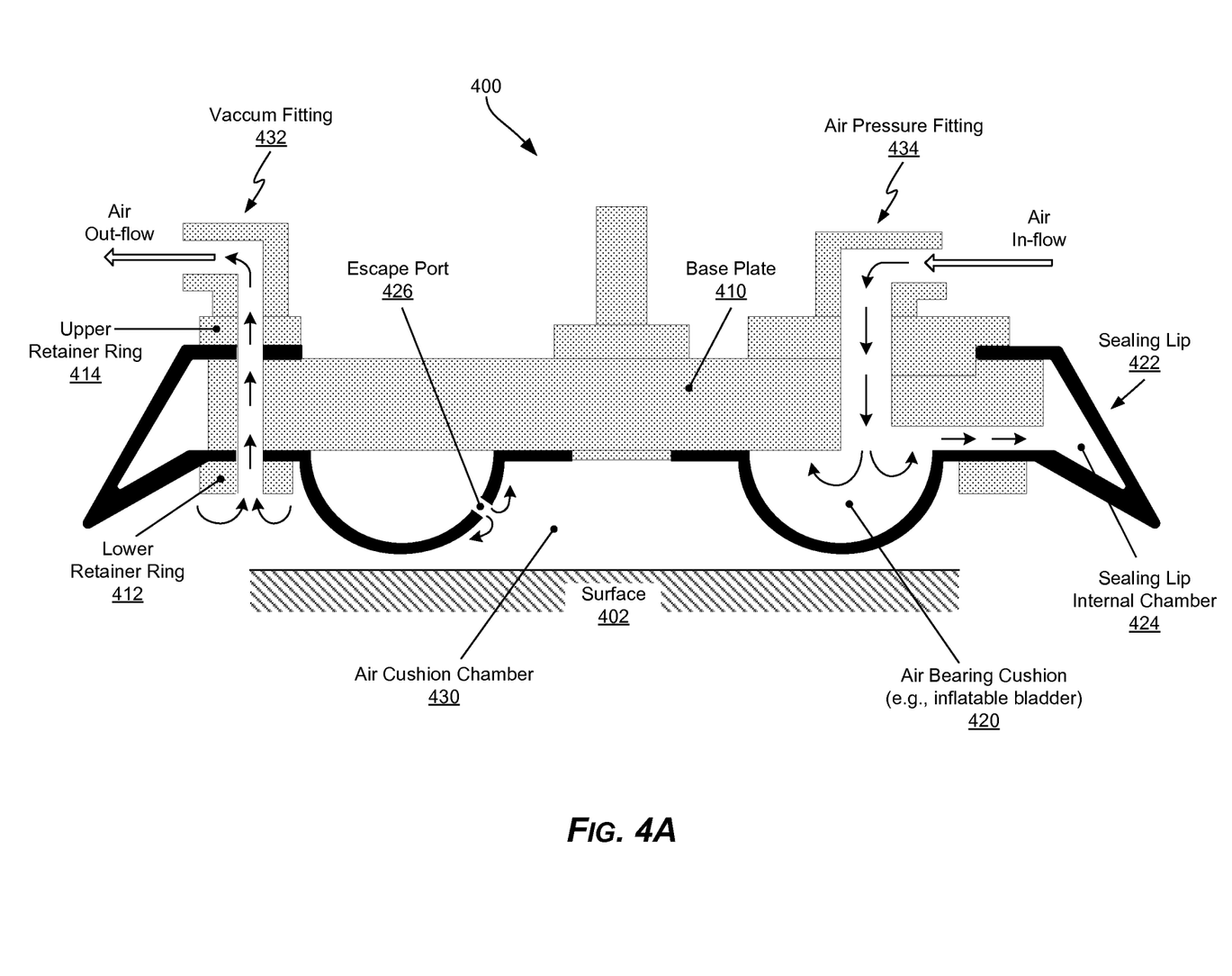
FIG. 4A is a diagram illustrating an example implementation of a dual function movement component, in accordance with an advantageous embodiment.

FIG. 4A is a diagram illustrating an example implementation of a dual function movement component, in accordance with an advantageous embodiment. Referring to FIG. 4A, there is shown a dual function movement device 400, which may be substantially similar to the dual function movement component 300 of FIG. 3.

The dual function movement device 400 may be configured to provide multiple movement related functions, comprising, for example, a hovering or gliding function (e.g., gliding over surfaces) and holding function (e.g., onto surfaces). For example, as shown in FIG. 4A, the dual function movement device 400 may be configured to provide the functions supported thereby in pneumatic manner. In this regard, the dual function movement device 400 may be configured to provide the hovering or gliding function (e.g., over surfaces) based on air bearing, and the holding function (e.g., onto surfaces) based on use of vacuum.

The dual function movement device 400 may comprise a plurality of elements adapted for supporting functions provided by the device. In this regard, the dual function movement device 400 may comprise a base plate 410, which may be similar to the base element 310 of FIG. 3. The base plate 410 may correspond to the main component of the dual function movement device 400, to which the remaining components may be attached or coupled.

The dual function movement device 400 may also comprise elements configured to support the air bearing based hovering or gliding function. For example, the dual function movement device 400 may comprise an air bearing cushion 420, which may be configurable to providing gliding or hovering over surfaces, such as surface 402. In this regard, surface 402 may be the surface of a structure being manufactured or assembled (e.g., aircraft or component thereof). The air bearing cushion 420 may comprise, for example, an inflatable bladder, which may expand by injection of air, and may be retracted by suction or removal of air therefrom. In some instances, hovering and/or gliding may be enhanced by use of particularly configured air flow that further enhance the gliding of the dual function movement device 400 (e.g., by reducing friction between any parts of the dual function movement device 400 that may remain in contact with the surface 402). For example, the air bearing cushion 420 may comprise one or more escape ports 426, which may allow for little of the air inside the air bearing cushion 420 to escape, flowing between the outside surface of the air bearing cushion 420 and the surface 402. The air bearing based hovering or gliding function of the dual function movement device 400 is explained in more detailed in FIGS. 4B and 4C.

The dual function movement device 400 may also comprise elements configured to support the vacuum based holding function. For example, the dual function movement device 400 may also comprise a sealing lip 422, which may be configured to provide sealing onto the surface 402. In this regard, as shown in FIG. 4A, the sealing lip 422 may be optionally implemented as extension of air bearing cushion 420. In some instances, the sealing lip 422 may comprise an internal chamber 424, to ensure that the sealing lip 422 does not affect the gliding or hovering of the dual function movement device 400 (e.g., by catching or snagging on the surface 402). In this regard, the sealing lip internal chamber 424 may configured to expand such that it may allow for pushing sealing lip 422 away from the surface 402. The dual function movement device 400 may also comprise an air cushion chamber 430. In this regard, the air cushion chamber 430 may implemented as cavity within the air bearing cushion 420. The air cushion chamber 430 may assist in providing a hold or suction onto the surface 402, such as by providing an internal space enclosed within the within the air bearing cushion 420 where vacuum may be applied to generate that hold or suction. The vacuum based holding function of the dual function movement device 400 is explained in more detailed in FIG. 4D.

The dual function movement device 400 may comprise a vacuum fitting 432 and an air pressure fitting 434, to provide air injunction and/or suction that may be required to support the vacuum based holding function and the air bearing based hovering or gliding function, respectively. In this regard, the vacuum fitting 432 may allow for sucking air out of particular spaces, to provide required vacuum. For example, the vacuum fitting 432 may allow for extracting air from the air cushion chamber 430. Such suction, combined with suspension of air injunction into the air bearing cushion 420, may provide the necessary vacuum to provide hold onto the surface 402. The air pressure fitting 434 may allow for injunction of (pressurized) air into particular spaces, such as air bearing cushion 420 and/or the sealing lip internal chamber 424, to provide the required air bearing. The air injunction may also allow for breaking any existing seal (e.g., by inflating the sealing lip internal chamber 424 to ensure that the sealing lip 422 is pushed off the surface 402).

In some instances, the air bearing cushion 420 and the sealing lip 422 (whether implemented as separate components or as singular, combined component) may be secured to the base plate 410 by use of, for example, retainer rings, such as a lower retainer ring 412 an upper retainer ring 414.

In some instances, dual function movement device 400 may incorporate particular measures to ensure that structures (or surfaces thereof) with which the dual function movement device 400 may be in contact are not damaged or altered during operations of the dual function movement device 400. For example, a soft coating (e.g., rubber) may be applied to parts of the dual function movement device 400 that would be in contact with surfaces during particular functions. The rubber coating may applied, for example, to the bottom of the base plate 410, the bottom of the lower retainer ring 412, and/or any other hard parts of the dual function movement device 400 that may come in contact with the surface 402, such while applying a 'holding' function thereto.

Figure 4B:
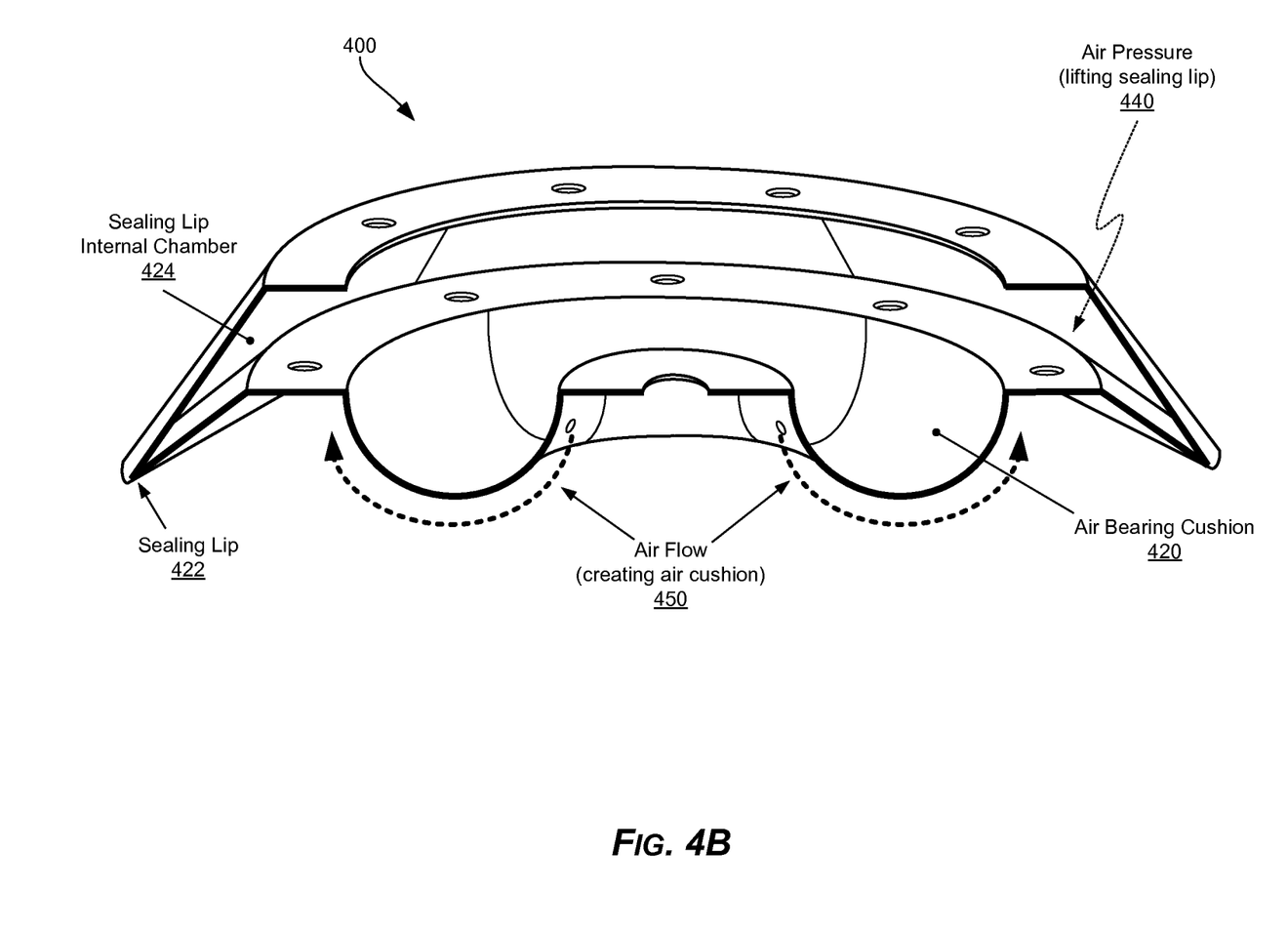
FIG. 4B is a diagram illustrating an example of air cushion creation and lip lifting in an example implementation of a dual function movement component, in accordance with an advantageous embodiment.

FIG. 4B is a diagram illustrating an example of air cushion creation and lip lifting in an example implementation of a dual function movement component, in accordance with an advantageous embodiment. Referring to FIG. 4B, there is shown a cross section, a suction cup/air bearing element of the dual function movement device 400.

In some instances, additional mechanisms may utilized by and/or implemented into to dual function movement components, such as the dual function movement device 400, to further enhance particular functions thereof. For example, as described with respect to FIG. 4A, during the 'hovering' or 'gliding' function, the air bearing cushion 420 may be inflated (using a pressurized air stream), thus expanding to create an air cushion, and also breaking any seal between the sealing lip 422 and surface(s) (e.g., the surface 402) with which the dual function movement device 400 may be in contact. The hovering or gliding function may be further enhanced by using the sealing lip internal chamber 424 to ensure that the sealing lip 422 does not affect the hovering or gliding of the dual function movement device 400. In this regard, the sealing lip internal chamber 424 may be inflated, using an air stream (e.g., the air stream used in inflating air bearing cushion 420) for example, such as to create air pressure 440 therein which may ensure that the sealing lip 422 is lifted and remains away from any contact surface(s), thus preventing the sealing lip 422 from catching or snagging on the surface(s). In some instances, to further enhance the hovering or gliding function, friction between the air-bearing cushion 420 and contact surfaces may be reduced. For example, the escape ports of the air bearing cushion 420 may allow for some of the pressurized air used in inflating the air bearing cushion 420 to escape, thus creating an air flow 450 on the outside the air-bearing cushion 420. In this regard, the air flow 450 may flow between the air bearing cushion 420 and contact surfaces, from the central cavity of the dual function movement device 400 outwards, which may create an 'air' cushion between the air bearing cushion 420 and the surface(s) (e.g., the surface 402).

Figure 4C:
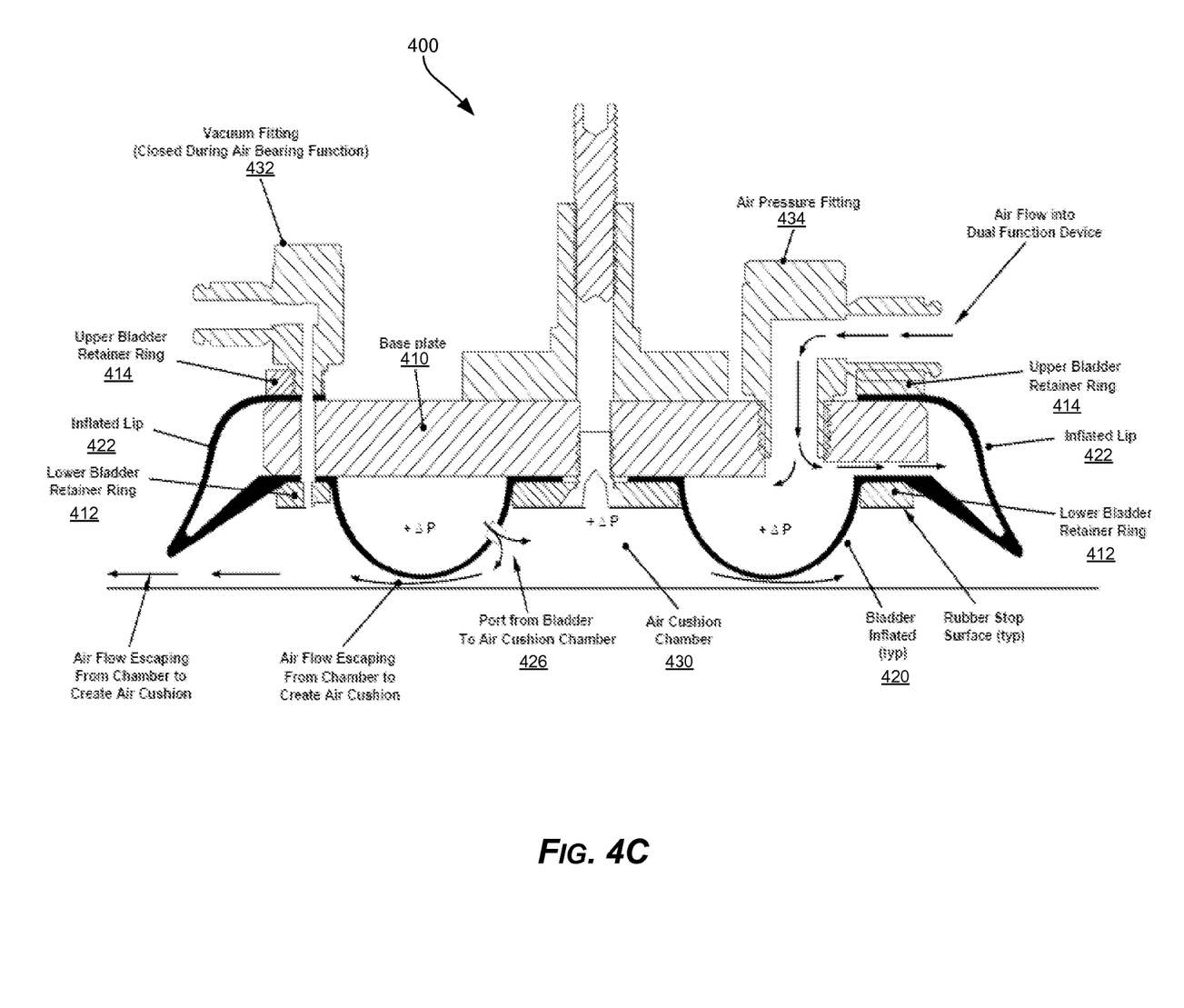
FIG. 4C is a diagram illustrating an example of air bearing function in an example implementation of a dual function movement component, in accordance with an advantageous embodiment.

FIG. 4C is a diagram illustrating an example of air bearing function in an example implementation of a dual function movement component, in accordance with an advantageous embodiment. Referring to FIG. 4C, there is shown the dual function movement device 400 of FIG. 4A.

As shown in FIG. 4C, the dual function movement device 400 may provide an air bearing based hovering or gliding function, such as by use of air flow (e.g., a pressurized air stream) injunction into the dual function movement device 400, through the air pressure fitting 434 for example. In this regard, the air in-flow into the dual function movement device 400 may be used to inflate the air bearing cushion (bladder) 420, creating a 'hovering' cushion that allow for gliding over any contact surface (e.g., the surface 402). The air in-flow may also be used to inflate the sealing lip internal chamber 424, thus lifting the sealing lip 422 away from the surface (e.g., to break any seal), and/or keeping the sealing lip 422 away from the surface as the dual function movement device 400 move (e.g., glide) over it, thus ensuring that the sealing lip 422 does not catching or snagging on the surface. The air in-flow may create 'high' air pressure within the bladder 420 (shown as +αP), especially when using pressurized air stream. The 'high' air pressure may be used to further enhance the hovering or gliding function, such as by supporting creation of air cushion using air flow escaping from the bladder 420 through the escape port(s) 426.

Figure 4D:
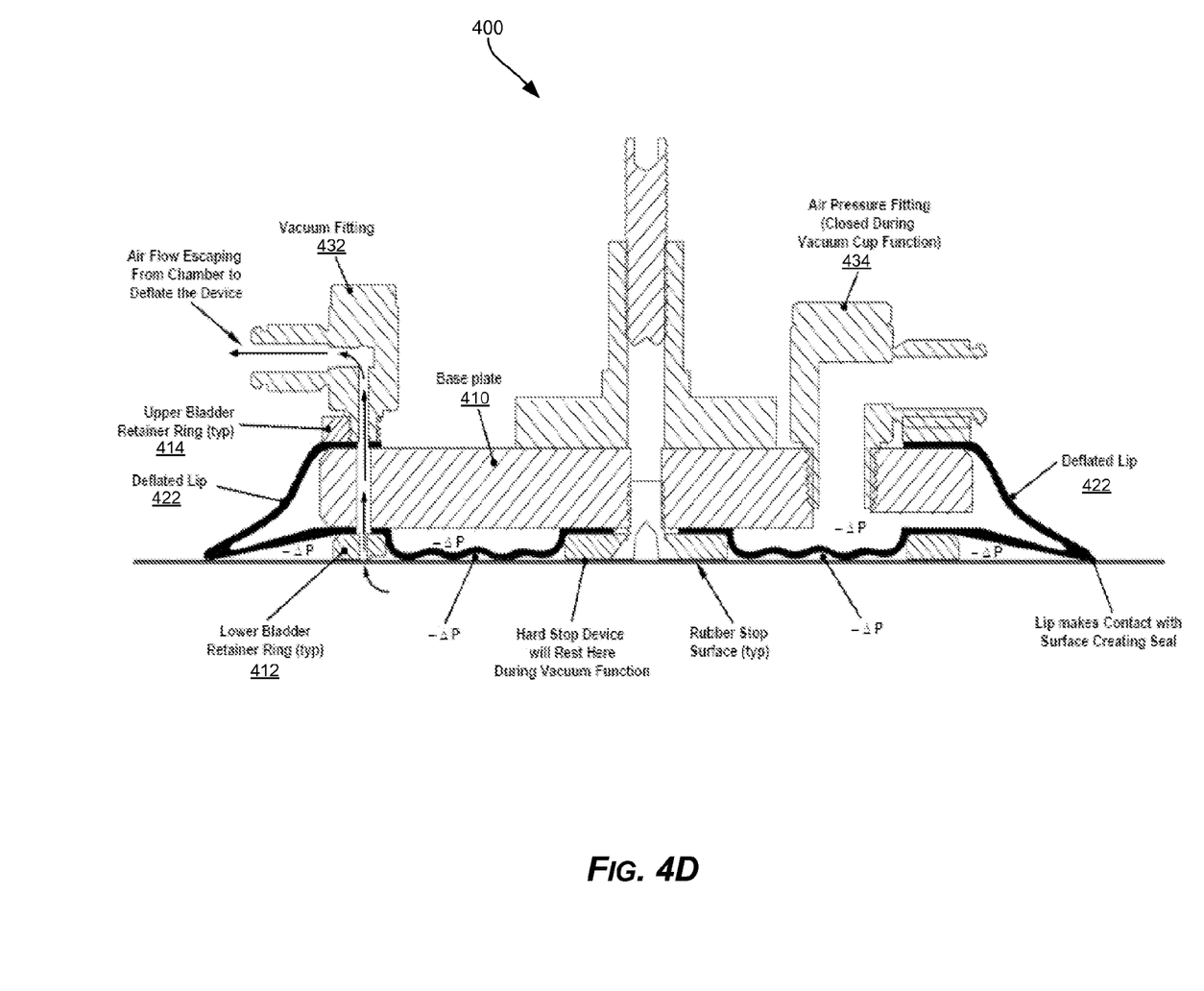
FIG. 4D is a diagram illustrating an example of vacuum based holding function in an example implementation of a dual function movement component, in accordance with an advantageous embodiment.

FIG. 4D is a diagram illustrating an example of vacuum based holding function in an example implementation of a dual function movement component, in accordance with an advantageous embodiment. Referring to FIG. 4D, there is shown the dual function movement device 400 of FIG. 4A.

As shown in FIG. 4D, the dual function movement device 400 may provide a vacuum based holding function by use of air flow (e.g., suction) from the dual function movement device 400, through the vacuum fitting 432 for example. In this regard, the air out-flow from the dual function movement device 400 may be used to deflate the air bearing cushion (bladder) 420. Furthermore, air in-flow that may typically be used to inflate bladder 420 (and/or the sealing lip internal chamber 424) may be stopped. The air out-flow (suction) through the vacuum fitting 432 may create 'low' air pressure within various spaces between the dual function movement device 400 and the surface (shown as −ΔP), which provide the required 'holding'. Furthermore, the air out-flow (combined with suspension of air injection into the sealing lip internal chamber 424, resulting in deflated sealing lip 422) may allow for creation of seal between the deflated sealing lip 422 and the surface (e.g., the surface 402).

Figure 5:
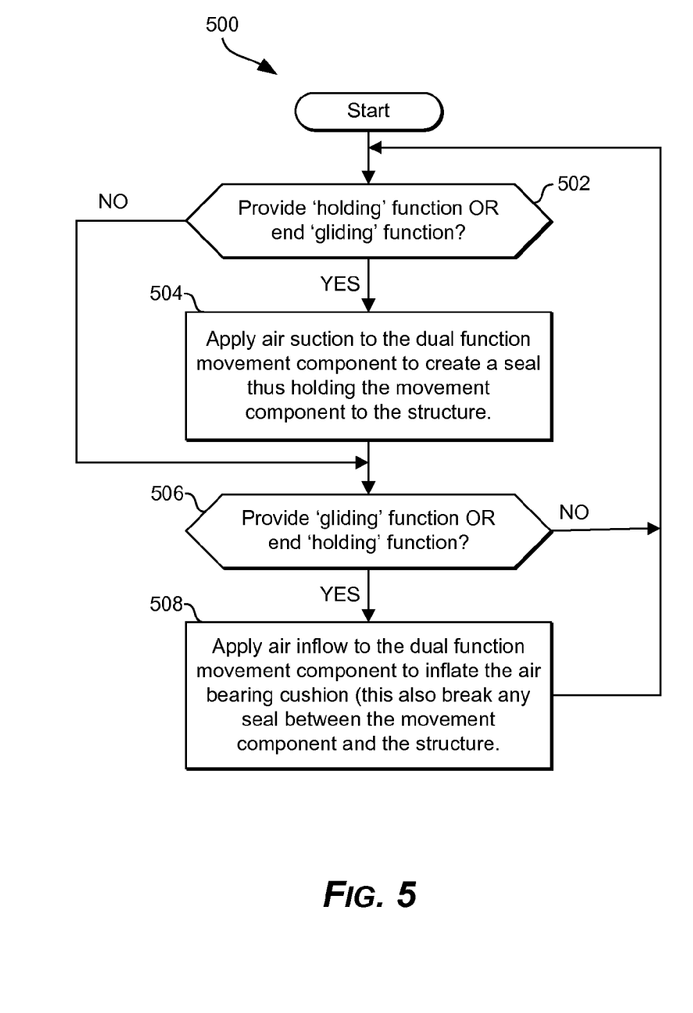
FIG. 5 is a flow chart that illustrates a process for applying different functions (e.g., hovering and holding) in dual function movement components, in accordance with an advantageous embodiment.

FIG. 5 is a flow chart that illustrates a process for applying different functions (e.g., hovering and holding) in dual function movement components, in accordance with an advantageous embodiment. Referring to FIG. 5, there is shown a flow chart 500 comprising a plurality of steps that may be performed to apply different functions by a movement component in an automated motorized device (e.g., the dual function movement component 300).

In step 502, it may be determined whether the movement component is being configured to provide 'holding' function or to end a 'gliding' function. In instances, where it may be determined that the 'holding' function is to be provided via the movement component or that the 'gliding' function is to be ended, the process may proceed to the step 504, otherwise the process may proceed to step 506. In step 504, air suction may be applied into the movement component (e.g., via the suction chamber pipe 340) to create a seal (via the sealing lip 324) and/or a vacuum (in the suction chamber 322), thus 'holding' the movement component to the structure (and/or ending the 'gliding' function). In some instances, ending the 'gliding' function may also comprise terminating (or even reversing) the air injection being applied during the 'gliding' function.

In step 506, it may be determined whether the movement component is being configured to provide 'gliding' function or to end a 'holding' function. In instances, where it may be determined that the 'gliding' function is to be provided via the movement component or that the 'holding' function is to be ended, the process may proceed to the step 508, otherwise the process may proceed (back) to step 502. In step 508, air inflow (injection) may be applied into the movement component (e.g., via the air bearing cushion pipe 350) to inflate the air bearing cushion (air bearing cushion 332) thus creating a hovering cushion that may allow 'gliding' the movement component. The air injection may also break any seal between the movement component and the surface (e.g., any seal between the sealing lip 324 and the surface 326), thus resulting in termination of any 'holding' function being applied. In some instances, ending the 'holding' function may also comprise terminating (or even reversing) the air suction being applied during the 'holding' function, thus allowing for terminating of the vacuum.

Referring specifically to the controller component mentioned herein, other embodiments may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein with respect to dual function movement component for automated assembly systems, and/or use thereof.

Accordingly, the presently disclosed embodiments may be realized in hardware, software, or a combination of hardware and software. The present embodiments may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The presently disclosed embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While described with reference to certain embodiments, it will be understood by those skilled in the art that various changes may be made and equivalents may be substituted without departing from the scope of the presently described embodiments. In addition, many modifications may be made to adapt a particular situation or material to the teachings without departing from its scope. Therefore, it is intended that the presently disclosed embodiments not be limited to the particular embodiment disclosed, but rather will include all embodiments falling within the scope of the appended claims.

What is claimed is:

1. A pneumatic device defining a chamber, the pneumatic device comprising:
   a sealing element configurable to contact a surface, to enable creating a seal around the chamber by application of pneumatic suction into the chamber, thus urging the pneumatic device towards the surface;
   a biasing element configurable to push the sealing element away from the surface, to enable disabling the urging towards the surface; and
   a pneumatic cushion configurable to expand, by application of pneumatic inflow, thus urging the pneumatic device away from the surface;
   wherein the pneumatic cushion comprises an inflatable bladder that is inflated by the application of the pneumatic inflow.

2. The pneumatic device of claim 1, wherein at least a portion of the pneumatic cushion is incorporated into the biasing element, the at least a portion of the pneumatic cushion being adapted to lift, when inflated, the biasing element thus pushing the sealing element away from the surface and break the seal around the chamber.

3. The pneumatic device of claim 1, wherein the pneumatic device is configured to hold an object coupled to pneumatic device to a structure by use of the seal created around the chamber by the application of the pneumatic suction.

4. The pneumatic device of claim 1, wherein the pneumatic device is configured to glide an object coupled to pneumatic device over a structure when is the pneumatic cushion is expanded by the application of the pneumatic inflow.

5. An apparatus, comprising:
   a movement assembly for use in an automated motorized device that is operable to traverse a structure, the movement assembly comprising a plurality of dual function movement components, wherein:
      functions of each dual function movement component comprise adhering to the structure and gliding over the structure; and
      each dual function movement component comprises a plurality of elements adapted for supporting each of the functions;
   wherein the plurality of elements of each dual function movement component comprises an inflatable bladder that is inflated to urge the dual function movement component away from the structure;
   wherein the movement assembly is operable to secure itself to the structure by configuring one or more of its plurality of dual function movement components to glide over the structure; and
   wherein the one or more of the plurality of dual function movement components are configured to glide over the structure by creating hovering effect by use of air bearing.

6. The apparatus of claim 5, wherein the movement assembly is operable to secure itself to the structure by configuring one or more of the plurality of dual function movement components to adhere to the structure.

7. The apparatus of claim 6, wherein the one or more of the plurality of dual function movement components are configured to adhere to the structure by creating vacuum by use of air suction.

* * * * *